United States Patent
Yamaki et al.

(10) Patent No.: US 9,010,855 B2
(45) Date of Patent: Apr. 21, 2015

(54) VEHICLE SEAT

(75) Inventors: Jogen Yamaki, Utsunomiya (JP); Hisato Oku, Utsunomiya (JP); Yozo Furuta, Utsunomiya (JP); Hiroyuki Kaku, Shioya-gun (JP)

(73) Assignees: Honda Motor Co., Ltd., Tokyo (JP); TS Tech Co., Ltd., Asaka-Shi (JP)

( * ) Notice: Subject to any disclaimer, the term of this patent is extended or adjusted under 35 U.S.C. 154(b) by 224 days.

(21) Appl. No.: 13/233,105

(22) Filed: Sep. 15, 2011

(65) Prior Publication Data
US 2012/0068506 A1 Mar. 22, 2012

(30) Foreign Application Priority Data

Sep. 17, 2010 (JP) ................................ 2010-209491
Sep. 17, 2010 (JP) ................................ 2010-209492

(51) Int. Cl.
| | | |
|---|---|---|
| *B60N 2/42* | (2006.01) | |
| *B60N 2/68* | (2006.01) | |
| *B60N 2/02* | (2006.01) | |
| *B60N 2/06* | (2006.01) | |
| *B60N 2/16* | (2006.01) | |
| *B60N 2/225* | (2006.01) | |
| *B60N 2/70* | (2006.01) | |

(52) U.S. Cl.
CPC .............. *B60N 2/682* (2013.01); *B60N 2/0232* (2013.01); *B60N 2/06* (2013.01); *B60N 2/1615* (2013.01); *B60N 2/225* (2013.01); *B60N 2/4235* (2013.01); *B60N 2/68* (2013.01); *B60N 2/7094* (2013.01); *B60N 2002/024* (2013.01); *B60N 2205/50* (2013.01)

(58) Field of Classification Search
USPC ................... 297/216.1, 216.13, 68.1, 452.18; 296/68.1
See application file for complete search history.

(56) References Cited

U.S. PATENT DOCUMENTS 4,076,306 A * 2/1978 Satzinger ................. 297/216.13
4,231,607 A * 11/1980 Bohlin ............................ 296/63
4,512,604 A * 4/1985 Maeda et al. ................ 296/68.1
(Continued)

FOREIGN PATENT DOCUMENTS

| JP | 2000-103275 | 4/2000 |
| JP | 2009-137348 | 6/2009 |
| JP | 2010-018190 | 1/2010 |

OTHER PUBLICATIONS

Japanese Office Action, Application No. 2010-209491, with English Translation dated Jan. 7, 2014, 5 pages.
(Continued)

*Primary Examiner* — David R Dunn
*Assistant Examiner* — Jody Giacoman
(74) *Attorney, Agent, or Firm* — Rankin, Hill & Clark LLP (57) ABSTRACT

The present invention provides a vehicle seat including: a seatback frame that includes a pair of an outer side frame portion and an inner side frame portion and a lower frame portion; a tilting shaft that supports the seatback frame at a position below the lower frame portion; and a first load transfer block that transfers an impact load input from a side portion of the vehicle body to the seatback frame, wherein the vehicle seat further includes a plate-shaped rigid member of which an upper end is connected to the lower frame portion and an inner end in the vehicle width direction is connected to the inner side frame portion in the vehicle width direction, and wherein a lower edge of the plate-shaped rigid member extends to at least a height position of the tilting shaft.

9 Claims, 6 Drawing Sheets

(56) References Cited

U.S. PATENT DOCUMENTS

| | | | |
|---|---|---|---|
| 5,253,924 A * | 10/1993 | Glance | 297/452.1 |
| 5,407,244 A * | 4/1995 | Nakano et al. | 296/68.1 |
| 5,716,094 A * | 2/1998 | Bhalsod et al. | 296/187.12 |
| 6,375,262 B1 * | 4/2002 | Watanabe | 297/284.4 |
| 6,607,247 B2 * | 8/2003 | Becker et al. | 297/452.18 |
| 6,857,698 B2 * | 2/2005 | Saberan et al. | 297/216.13 |
| 7,090,293 B2 * | 8/2006 | Saberan et al. | 297/216.13 |
| 7,284,800 B2 * | 10/2007 | Ishizuka | 297/452.18 |
| 7,328,938 B2 * | 2/2008 | Matsuda | 296/187.12 |
| 7,513,574 B2 * | 4/2009 | Nagayama et al. | 297/452.18 |
| 7,527,334 B2 * | 5/2009 | Kiehler et al. | 297/216.13 |
| 2002/0024241 A1 * | 2/2002 | Umezawa et al. | 297/216.1 |
| 2002/0043832 A1 * | 4/2002 | Watanabe | 297/216.13 |
| 2008/0203787 A1 * | 8/2008 | Tracht et al. | 297/217.1 |
| 2009/0021061 A1 * | 1/2009 | Yamaki et al. | 297/216.13 |
| 2010/0187876 A1 * | 7/2010 | Nitsuma | 297/216.13 |
| 2011/0298267 A1 * | 12/2011 | Yamaki et al. | 297/391 |
| 2012/0091766 A1 * | 4/2012 | Yamaki et al. | 297/216.1 |
| 2012/0217775 A1 * | 8/2012 | Fujita et al. | 297/216.13 |
| 2013/0264849 A1 * | 10/2013 | Adachi et al. | 297/216.1 |

OTHER PUBLICATIONS

Japanese Office Action, Application No. 2010-209492, with English Translation dated Jan. 7, 2014, 4 pages.

* cited by examiner

VEHICLE SEAT

Priority is claimed on Japanese Patent Application No. 2010-209491, filed Sep. 17, 2010, and Japanese Patent Application No. 2010-209492, filed Sep. 17, 2010, the contents of which are incorporated herein by reference.

BACKGROUND OF THE INVENTION

1. Field of the Invention

The present invention relates to a vehicle seat having a function of transferring an impact load, input from a side portion of a vehicle, to an inner area of a vehicle body in the width direction.

2. Description of the Related Art

For example, Japanese Unexamined Patent Application, First Publication No. 2000-103275 discloses a technique of transferring an impact load, input from a side portion of a vehicle in the event of a collision or the like, to the inside of a vehicle body in the width direction through a seat.

In the vehicle seat, a seatback frame is formed in a rectangular frame shape, and a load transfer block is attached to a side frame portion near the outside in the vehicle width direction so as to protrude outward in the seat width direction and transfer an impact load input from a center pillar or the like of a vehicle body side portion to the seatback frame. Further, lower portions of left and right side frame portions of the seatback frame are connected to each other through a lower frame portion extending in the vehicle width direction, and an extension end extending downward in relation to the lower frame portion in the side frame portion is connected to a rear end of a cushion frame through a tilting shaft so as to be tiltable.

Accordingly, in the vehicle seat, when the vehicle body side portion is deformed by the input of the impact load, the vehicle body side portion comes into contact with the load transfer block, and the impact load is highly efficiently transferred to the inside of the vehicle body in the width direction through the lower frame portion and the outer side frame portion in the vehicle width direction.

However, in existing vehicle seats, the lower extension end of the side frame portion of the seatback frame is connected to the rear end of the cushion frame through the tilting shaft. For this reason, the lower frame portion used as a main load transfer path of the lower side of the seatback frame in the event of the impact load needs to be disposed to be deviated upward from the lower end of the seatback frame in order to prevent an interference with the tilting shaft. For this reason, in the case of the existing vehicle seat, the impact load input to the outer side frame portion in the vehicle width direction may not be highly efficiently transferred to the inside in the vehicle width direction in the lower area of the seatback frame at the same height as that of the tilting shaft.

Therefore, it is a first object of the invention to provide a vehicle seat capable of highly efficiently transferring an impact load to the inside in the vehicle width direction at the lower area of the seatback frame.

Further, particularly, when a driving motor for adjusting the tilting angle of the seatback frame needs to be assembled to the lower area of the seatback, the lower frame portion needs to be disposed to be deviated further upward in order to prevent the lower frame portion from interfering with the driving motor.

For this reason, in the case of the existing vehicle seat, the impact load input to the outer side frame portion in the vehicle width direction may not be highly efficiently transferred to the sufficiently low position of the seatback frame in the vehicle width direction.

Therefore, it is a second object of the invention to provide a vehicle seat capable of highly efficiently transferring an impact load to the inside in the vehicle width direction at the lower area of the seatback frame while compactly assembling the driving motor for adjusting the tilting angle of the seatback frame to the lower area of the seatback frame.

SUMMARY OF THE INVENTION

The present invention employs the following configuration to solve the above problems.

(1) An aspect of the present invention is a vehicle seat including: a seatback frame that includes a pair of an outer side frame portion and an inner side frame portion which are disposed to be spaced from each other in the seat width direction and are disposed near an inside and an outside of the vehicle width direction, and a lower frame portion extending in the seat width direction between lower areas of the outer side frame portion and the inner side frame portion; a tilting shaft that supports the seatback frame at a position below the lower frame portion so as to be tiltable about a cushion frame or a vehicle body; and a first load transfer block that protrudes outward in the vehicle width direction from an upper side of the outer side frame portion in the vehicle width direction and transfers an impact load input from a side portion of the vehicle body to the seatback frame, the first load transfer block being provided above the tilting shaft, wherein the vehicle seat further includes a plate-shaped rigid member of which an upper end is connected to the lower frame portion and an inner end in the vehicle width direction is connected to the inner side frame portion in the vehicle width direction, and wherein a lower edge of the plate-shaped rigid member extends to at least the height position of the tilting shaft.

(2) The vehicle seat in (1) may further include a second load transfer block that protrudes outward in the seat width direction from a position extending from the tilting shaft near the outer side frame portion in the vehicle width direction and transfers the impact load input from the side portion of the vehicle body to the seatback frame.

(3) In the vehicle seat in (1), the plate-shaped rigid member may be connected to the inner side frame portion in the vehicle width direction at the height position lower than the tilting shaft.

(4) The vehicle seat in (1) may further include: a plate-shaped reinforcement member of which an upper end is connected to the lower frame portion or an upper portion of the plate-shaped rigid member and a lower end is connected to a lower end of the plate-shaped rigid member, wherein the plate-shaped rigid member and the plate-shaped reinforcement member form a closed cross-section extending in the vehicle width direction.

(5) In the vehicle seat in (4), the tilting shaft may be disposed inside the closed cross-section formed by the plate-shaped rigid member and the plate-shaped reinforcement member.

(6) In the vehicle seat in (1), a distant space may be provided between an inner end of the lower frame portion in the vehicle width direction and the inner side frame portion in the vehicle width direction, and a driving motor may be disposed in the distant space so as to adjust a tilting angle of the seatback frame.

(7) In the vehicle seat in (6), the plate-shaped rigid member may connect the lower frame portion to the inner side frame portion in the vehicle width direction by bypassing an outside of the driving motor.

(8) In the vehicle seat in (7), the plate-shaped rigid member may extend from the lower frame portion to a height going around a lower side of the driving motor, and the inner end of the plate-shaped rigid member in the vehicle width direction may be attached to the inner side frame portion in the vehicle width direction across a height area lower than the driving motor.

DETAILED DESCRIPTION OF THE INVENTION

Hereinafter, an exemplary embodiment of the invention will be described by referring to the accompanying drawings. Furthermore, in the drawings, the arrow F indicates the front side of the vehicle.

Figure 1:
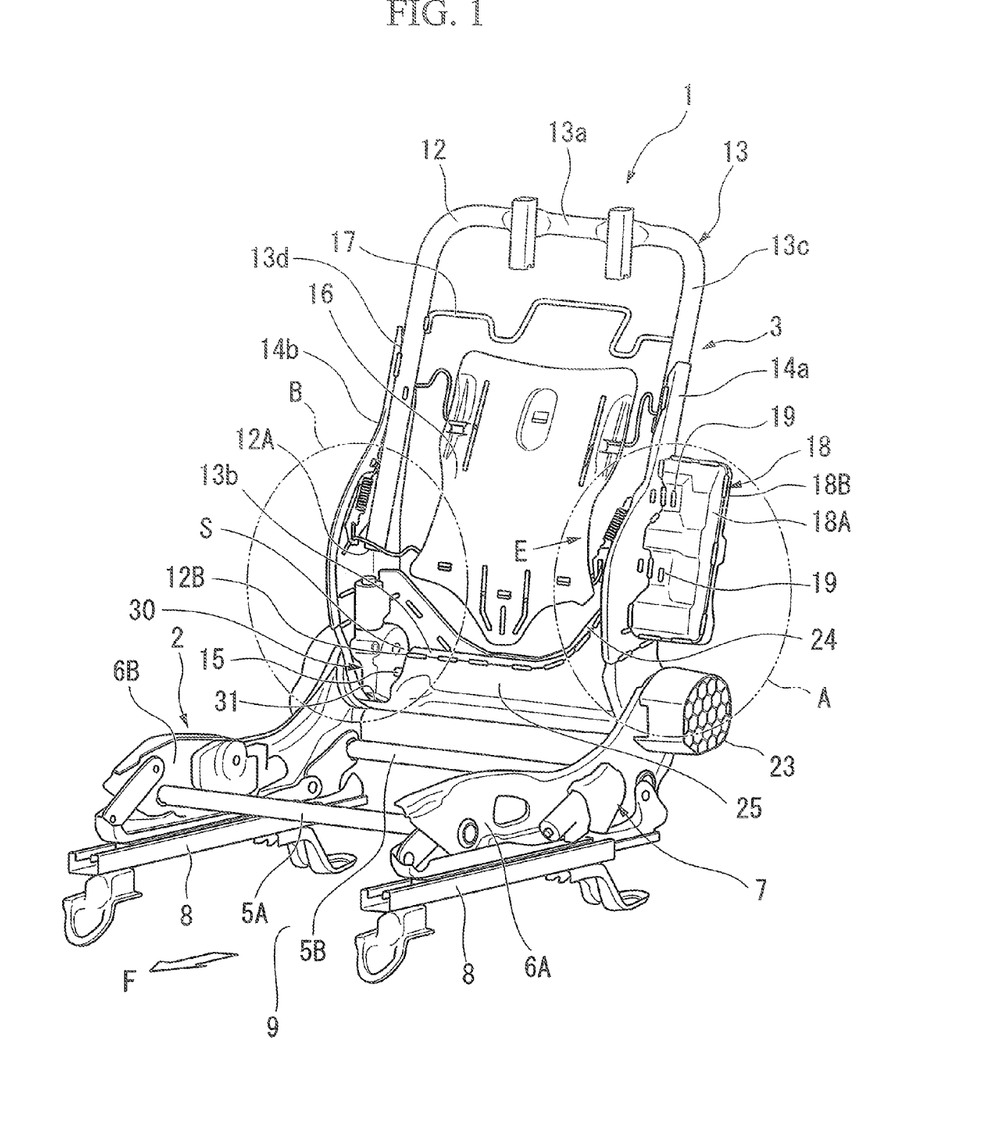
FIG. 1 is a perspective view illustrating a structure of a vehicle seat of an embodiment of the invention when seen from the front side thereof.
Figure 2:
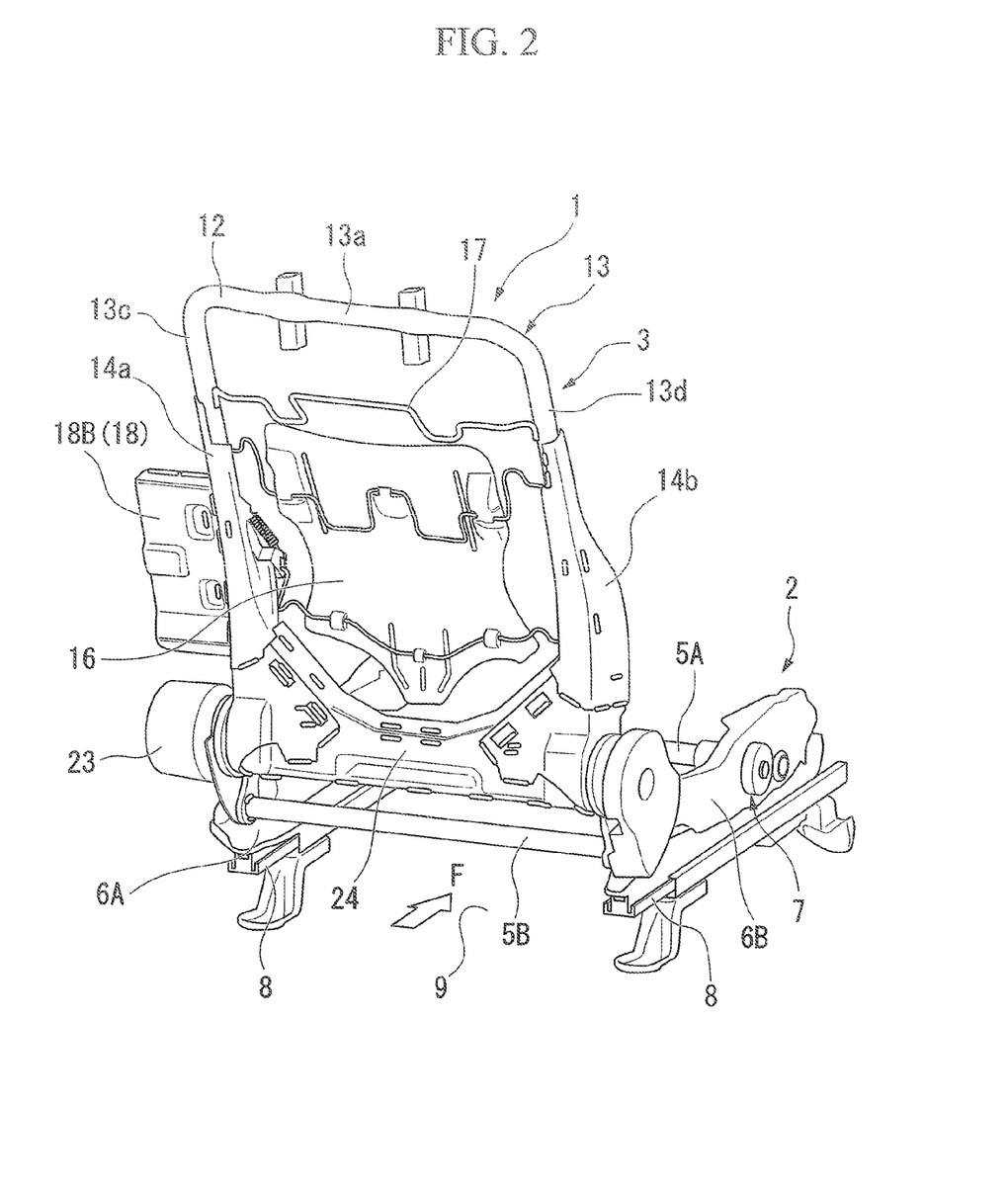
FIG. 2 is a perspective view illustrating the structure of the vehicle seat of the embodiment of the invention when seen from the rear side thereof.

FIG. 1 is a perspective view illustrating a structure of a vehicle seat 1 disposed at the left front seat of a vehicle when seen from the oblique upside of the front portion thereof, and FIG. 2 is a perspective view illustrating the structure of the vehicle seat 1 when seen from the oblique upside of the rear portion thereof.

The vehicle seat 1 includes a seat cushion 2 that supports the hip of a passenger, a seatback 3 that is connected to the rear end of the seat cushion 2 and supports a waist and a back of the passenger, and a headrest (not shown) that is supported to the upper portion of the seatback 3 and supports the head and neck of the passenger.

The seat cushion 2 includes a cushion frame 7 that is formed in a rectangular frame shape by front and rear pipe materials 5A and 5B and side plate materials 6A and 6B, and the cushion frame 7 is attached to a vehicle body floor 9 through seat rails 8 and 8 so as to be slidable forward and backward.

The seatback 3 includes a substantially rectangular-frame-shaped seatback frame 13 formed by an upper frame portion 13a, left and right side frame portions 13c and 13d, and a lower frame portion 13b. The upper frame portion 13a and the lower frame portion 13b are formed of a pipe material extending in the vehicle width direction, and the left and right side frame portions 13c and 13d have a structure in which side plates 14a and 14b corresponding to plate materials having a substantially U-shaped cross-section are attached to the outside of the pipe material. The pipe materials of the frame portions 13c, 13a, 13d, and 13b are formed by bending an integral structure pipe 12 in a substantially rectangular shape.

However, as shown in FIG. 1, the structure pipe 12 has a structure in which one end 12A is located at the side frame portion 13d near the inside of the vehicle width direction (hereinafter, referred to as the "inner side frame portion 13d"), the other end 12B is located at the lower frame portion 13b, and the intermediate portion extends across the upper frame portion 13a and the side frame portion 13c near the outside of the vehicle width direction (hereinafter, referred to as the "outer side frame portion 13c"). However, one end 12A of the structure pipe 12 starts from a position spaced upward by a predetermined distance from the lower end of the inner side frame portion 13d, and the other end 12B finishes before the inner side frame portion 13d. That is, the portion forming the lower frame portion 13b of the structure pipe 12 forms a distant space S between the lower frame portion 13b and the inner side frame portion 13d.

Further, in the case of the embodiment, the side plates 14a and 14b forming the outer side frame portion 13c and the inner side frame portion 13d are formed by attaching a plurality of plate materials to each other.

Incidentally, the lower ends of the side plates 14a and 14b near the inside and the outside of the vehicle width direction extend downward in relation to the lower frame portion 13b. The vicinities of the lower ends of the side plates 14a and 14b are disposed inside the rear end areas of the plate materials 6A and 6B at both sides of the cushion frame 7, and are connected to the rear end of the cushion frame 7 through the tilting shaft 15 so as to be tiltable. The tilting shaft 15 constitutes a shaft of a reclining mechanism, and extends along the vehicle width direction so as to cross the plate materials 6A and 6B at both sides of the cushion frame 7.

Furthermore, in the drawing, the reference numerals 16 and 17 respectively indicate a support mat and a support wire attached to the outer side frame portion 13c and the inner side frame portion 13d so as to support a pad (not shown) of the seatback 3.

Further, a driving motor 30 may be disposed in the distant space S which is provided between the lower frame portion 13b and the inner side frame portion 13d, so as to electrically adjust the tilting angle of the seatback frame 13 by applying a rotational force to the seatback frame 13 about the tilting shaft 15. In this case, the driving motor 30 is provided in the range across the distant space S from the peripheral area of the tilting shaft 15.

Figure 3:
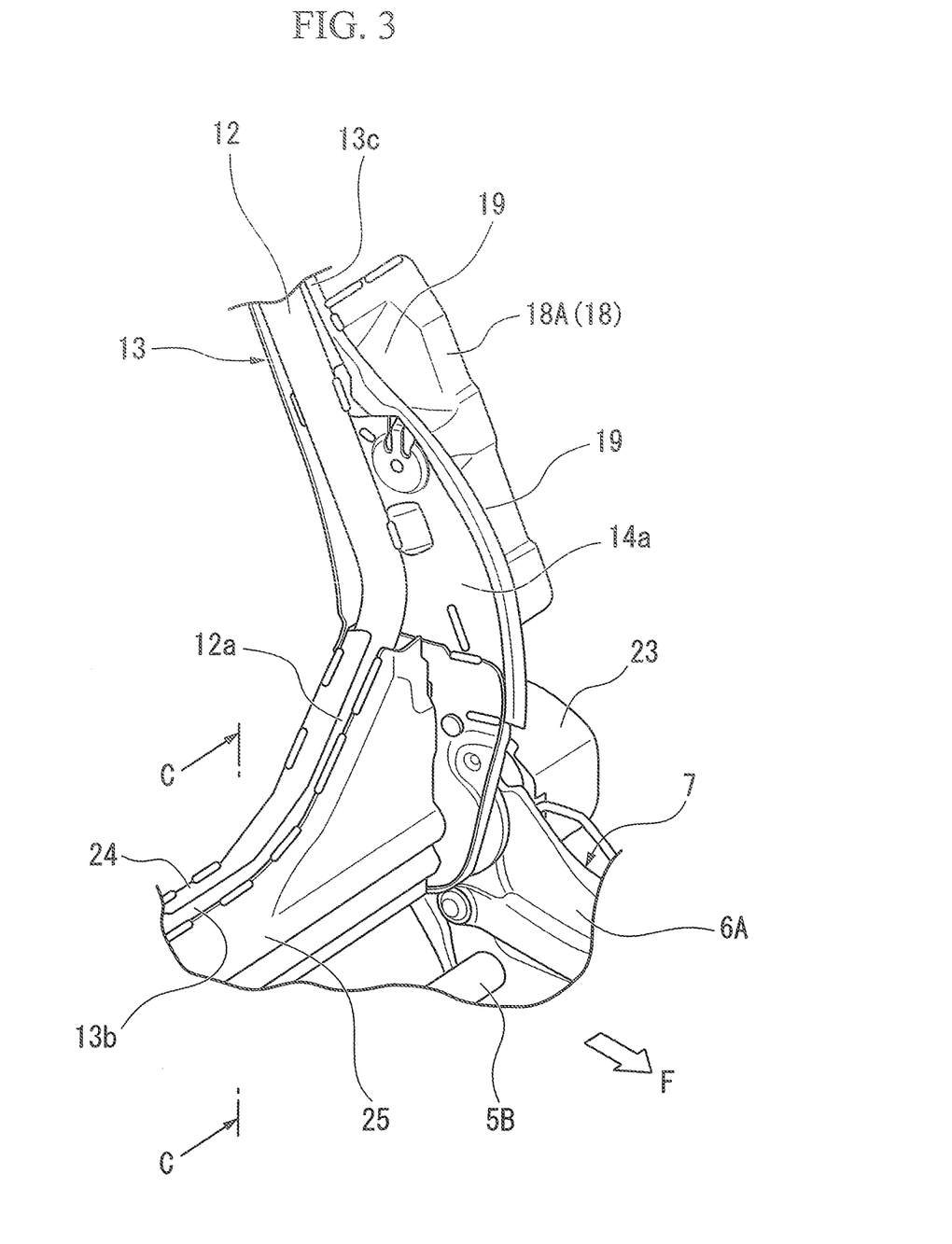
FIG. 3 is a perspective view illustrating a part A of FIG. 1 of the vehicle seat of the embodiment of the invention when seen in the direction E.
Figure 4:
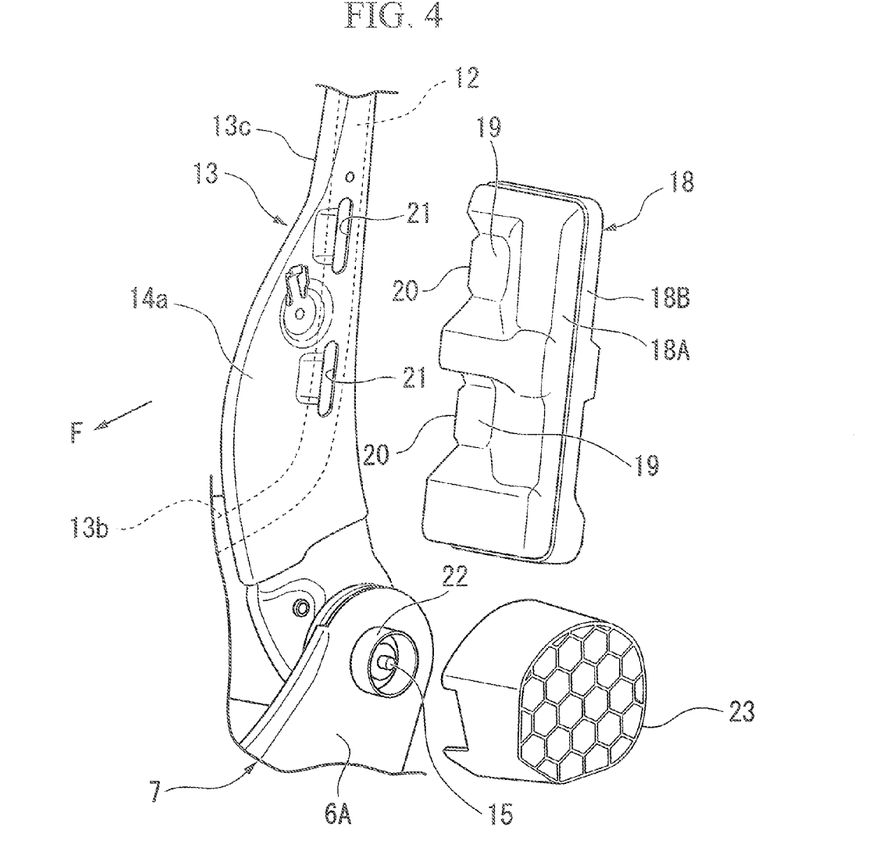
FIG. 4 is an exploded perspective view illustrating the part A of FIG. 1 of the vehicle seat of the embodiment of the invention.
Figure 5:
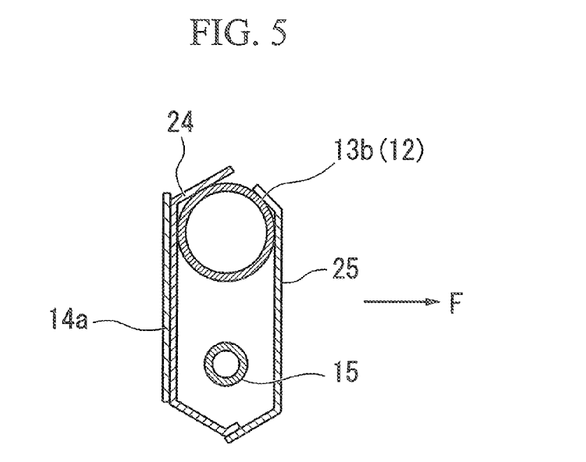
FIG. 5 is a cross-sectional view corresponding to the cross-section C-C of FIG. 3 of the vehicle seat of the embodiment of the invention.
Figure 6:
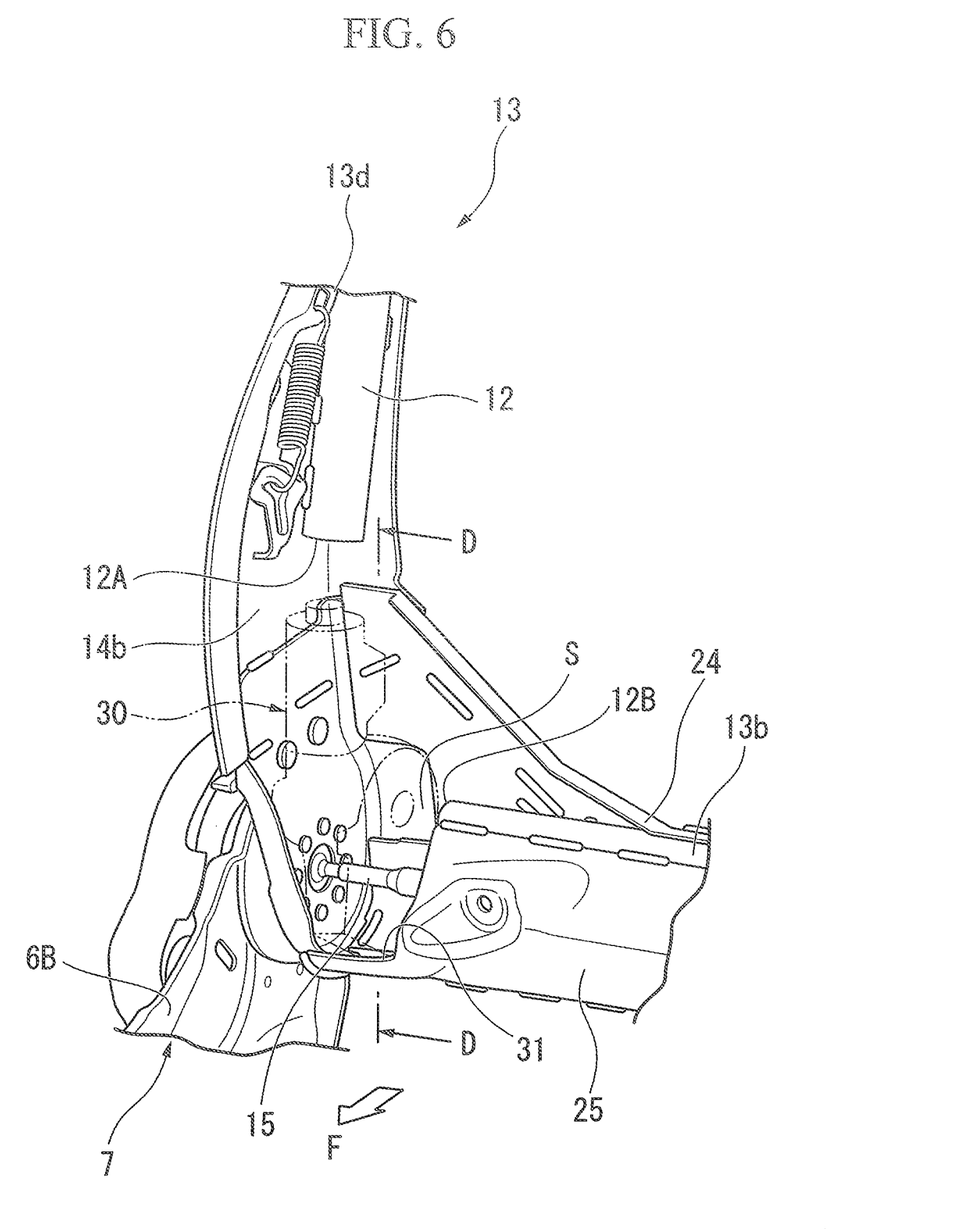
FIG. 6 is an enlarged perspective view illustrating a part B of FIG. 1 of the vehicle seat of the embodiment of the invention.
Figure 7:
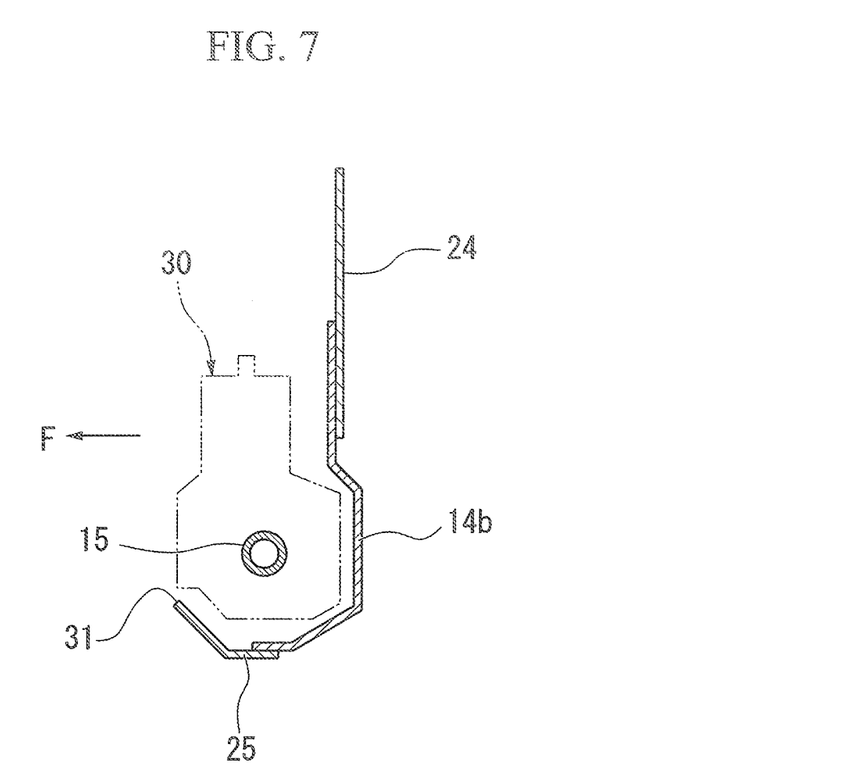
FIG. 7 is a cross-sectional view corresponding to the cross-section D-D of FIG. 6 of the vehicle seat of the embodiment of the invention.

FIGS. 3 and 4 are diagrams respectively illustrating an area in the vicinity of the connecting portion of the lower half area of the outer side frame portion 13c and the lower frame portion 13b, and FIG. 5 is a cross-sectional view corresponding to the cross-section C-C of FIG. 3. Further, FIG. 6 is a diagram illustrating an area in the vicinity of the connecting portion of the lower half area of the inner side frame portion 13d and the lower frame portion 13b, and FIG. 7 is a cross-sectional view corresponding to the cross-section D-D of FIG. 6.

A first load transfer block 18 (load transfer block), which protrudes outward in the vehicle width direction and transfers an impact load input from a vehicle body side portion (for example, a center pillar) in the event of a side collision to the seatback frame 13, is attached to the outer surface in the vehicle width direction of the side plate 14a forming the outer side frame portion 13c.

The first load transfer block 18 is configured by attaching the peripheral edges of front and rear blocks 18A and 18B which are formed in a metallic substantially rectangular half divided container shape, and the substantially rectangular cross-section in the longitudinal direction of the first load transfer block 18 extends outward in the vehicle width direction. The front surface of the front block 18A is a seat surface to which an airbag unit (not shown) is attached, and the inner peripheral edge of the front block 18A in the vehicle width direction is provided with a pair of recess portions 19 and 19 spaced from each other in the vertical direction. The inner peripheral edge of the front block 18A is rippled in the vertical direction by the recess portions 19 and 19, so that the rigidity in the vehicle width direction improves. Further, the inner area in the vehicle width direction of the bottom wall of each recess portion 19 is provided with a tongue piece portion 20 that protrudes inward in the vehicle width direction.

The first load transfer block 18 is disposed on the outer surface of the side plate 14a in the vehicle width direction, and the peripheral area of the contact portion with the side plate 14a is fixed to the side plate 14a by welding. However, as shown in FIG. 4, elongated-hole-shaped penetration holes 21 and 21 are formed at positions on the side plate 14a corresponding to the tongue piece portions 20 of the first load transfer block 18, and the tongue piece portions 20 are directly welded to the structure pipe 12 through the penetration holes 21 and 21.

Further, as shown in FIG. 4, a cylindrical boss portion 22 protrudes from the rear end of the outer plate material 6A in the vehicle width direction of the cushion frame 7 so as to surround the outer peripheral area of the tilting shaft 15, and a second load transfer block 23 is attached to the boss portion 22. The second load transfer block 23 is a member that directly transfers the impact load input from the lower area of the vehicle body side portion in the event of a side collision of the vehicle to the lower end area (an area where the tilting shaft 15 is present) of the seatback frame 13, and is formed in a honeycomb structure in which a plurality of cylindrical cross-sections extending in the vehicle width direction is disposed in parallel, so that it is formed of a resin in a short shaft cylindrical shape as a whole.

Incidentally, a metallic rear under plate 24 (plate-shaped rigid member), of which both edges in the seat width direction are attached to the outer side frame portion 13c and the inner side frame portion 13d, is attached to the lower frame portion 13b disposed above the tilting shaft 15. In the rear under plate 24, the upper edge is welded and fixed to the rear upper surface of the lower frame portion 13b. Then, as shown in FIG. 5, the area extending downward from the welding and fixing portion covers the rear side of the tilting shaft 15, and the lower edge is bent forward to cover the lower side of the tilting shaft 15. In the case of the embodiment, the entire lower end of the rear under plate 24 extends to a position lower than the tilting shaft 15. Further, both lower edges of the rear under plate 24 are welded and fixed to the side plates 14a and 14b of the outer side frame portion 13c and the inner side frame portion 13d at the position lower than the tilting shaft 15.

In particular, when the driving motor 30 is disposed at the distant space S, as shown in FIGS. 6 and 7, the inner edge of the rear under plate 24 in the vehicle width direction extends to go around the lower side while bypassing the outer rear side of the driving motor 30, and may be attached to the side plate 14b of the inner side frame portion 13d across the height area lower than the driving motor 30. Specifically, the inner edge of the rear under plate 24 in the vehicle width direction is disposed and welded onto the circular-arc surface of the lower end of the side plate 14b.

Further, in the case of the embodiment, as shown in FIG. 3, the structure pipe 12 forming the lower frame portion 13b is provided with a slope 12a that is bent obliquely upward and toward the outer side frame portion 13c (side plate 14a). In the outer edge of the rear under plate 24 in the vehicle width direction, the height of the upper end gradually increases toward the side end along the slope 12a. Furthermore, as shown in FIG. 6, the other end 12B of the structure pipe 12 forming the lower frame portion 13b does not extend to the inner side frame portion 13d. However, as for the inner edge of the rear under plate 24 in the vehicle width direction, the height of the upper end gradually increases toward the side end as in outer edge in the vehicle width direction.

Further, a metallic front under plate 25 (plate-shaped reinforcement member) is disposed in front of the lower frame portion 13b and the tilting shaft 15. As shown in FIG. 5, the upper end of the front under plate 25 is welded and fixed to the front upper surface of the lower frame portion 13b, and both edges in the seat width direction are welded and fixed to the side plates 14a and 14b of the outer side frame portion 13c and the inner side frame portion 13d. Furthermore, the upper end of the front under plate 25 may be welded and fixed to the upper end of the rear under plate 24. Then, the area extending downward from the lower frame portion 13b of the front under plate 25 covers the front side of the tilting shaft 15, and the lower edge is bent backward at a position lower than the tilting shaft 15 and is welded and fixed to the lower end of the rear under plate 24 at a position covering the lower side of the tilting shaft 15. Furthermore, in the outer edge of the front under plate 25 in the vehicle width direction, the height of the upper end gradually increases toward the side end as in the rear under plate 24. However, in the inner edge of the front under plate 25 in the vehicle width direction, the area across the upper surface from the front surface of the tilting shaft 15 is formed with an opening.

Further, when the driving motor 30 is disposed in the distant space S, the front under plate 25 may be provided with an opening 31, and a part of the driving motor 30 may protrude from the opening 31. Accordingly, when tilting the seatback frame 13, the interference between the driving motor 30 and the front under plate 25 is prevented.

As shown in FIG. 5, the front under plate 25 forms a closed cross-section extending in the vehicle width direction together with the rear under plate 24. The closed cross-section formed by the front under plate 25 and the rear under plate 24 covers the periphery of the tilting shaft 15, and connects the lower ends of the outer side frame portion 13c and the inner side frame portion 13d to each other.

In the above-described configuration, when the impact load generated in the event of a side collision of the vehicle is input to the vehicle body side portion and the vehicle body side portion is deformed inward in the vehicle width direction, the deformed vehicle body side portion comes into contact with at least one of the first load transfer block 18 and the second load transfer block 23, and the impact load is transferred to the outer side frame portion 13c of the seatback frame 13.

In this manner, when the impact load is input to the outer side frame portion 13c, the rear under plate 24 and the front under plate 25 extending the vehicle width direction transfer the impact load to the lower end of the inner side frame portion 13d together with the lower frame portion 13b. The load transferred to the inner side frame portion 13d moves inward in the vehicle width direction of the entire seatback frame 13, and is promptly transferred to a floor tunnel (not shown) through a console box (not shown) at the center in the vehicle width direction.

As described above, in the vehicle seat 1, the rear under plate 24 provided across the range below the height position of the tilting shaft 15 from the lower frame portion 13b extends in the vehicle width direction at a position offset from the tilting shaft 15, the upper edge of the rear under plate 24 is fixed to the tilting shaft 15, and both edges in the vehicle width direction are respectively fixed to the side plates 14a and 14b of the outer side frame portion 13c and the inner side frame portion 13d. Accordingly, the vertical width between the tilting shaft 15 and the lower frame portion 13b may be sufficiently ensured, so that the strength of the lower ends of both side frame portions 14a and 14b may improve while preventing the interference therebetween. Accordingly, the impact load may be highly efficiently transferred to the inside in the vehicle width direction at the lower area of the seatback frame 13.

Further, in the vehicle seat 1, the first load transfer block 18 is attached to the upper position of the outer side frame portion 13c in relation to the tilting shaft 15, and the second load transfer block 23 is attached to the plate material 6A of the cushion frame 7 located at the outside of the outer side frame portion 13c so as to be located on the extension line of the tilting shaft 15. Accordingly, the deformation of the vehicle body side portion in the event of a side collision may be reliably received and stopped by the first load transfer block 18 and the second load transfer block 23, and the impact load may be reliably transferred to the inside in the vehicle width direction through the lower frame portion 13b and the rear under plate 24.

Furthermore, in the vehicle seat 1, the rear under plate 24 is attached to the inner side frame portion 13d at the height lower than the tilting shaft 15, and in particular, as shown in FIG. 6, the edge of the rear under plate 24 is attached so as to surround the circular-arc surface of the lower end of the side plate 14b of the inner side frame portion 13d. Accordingly, the impact load may be highly efficiently transferred to a sufficiently low position of the inner side frame portion 13d.

Further, in the case of the vehicle seat 1, the front under plate 25, of which the upper end is attached to the lower frame portion 13b and the lower end is connected to the lower end of the rear under plate 24, forms the closed cross-section extending in the vehicle width direction together with the rear under plate 24. Then, both ends of the front under plate 25 in the vehicle width direction are attached to the outer side frame portion 13c and the inner side frame portion 13d. Accordingly, the impact load may be highly efficiently transferred to the lower end of the inner side frame portion 13d through the closed cross-section formed by the rear under plate 24 and the front under plate 25.

Furthermore, in the vehicle seat 1, the tilting shaft 15 is disposed inside the closed cross-section formed by the rear under plate 24 and the front under plate 25. Accordingly, the area of the closed cross-section formed by the rear under plate 24 and the front under plate 25 may be largely ensured without causing an interference with the tilting shaft 15, so that the transfer efficiency of the impact load can be improved.

Further, in the vehicle seat 1, the driving motor 30 for adjusting the reclining degree may be disposed in the distant space S which is provided between the lower frame portion 13b and the inner side frame portion 13d of the seatback frame 13, and the rear under plate 24 as the plate-shaped rigid member may connect the lower frame portion 13b and the inner side frame portion 13d to each other while going around the outside of the driving motor 30. In this case, the driving motor 30 can be compactly assembled to the lower area of the seatback frame 13, and in this state, the impact load input from the vehicle body side portion can be highly efficiently transferred to the inner area in the vehicle width direction at the lower area of the seatback frame 13 by the cooperation of the lower frame portion 13b and the rear under plate 24.

Further, in the vehicle seat 1, the rear under plate 24 may extend to the height going around the lower side of the driving motor 30, and the inner end of the rear under plate 24 in the vehicle width direction may be attached to the inner side frame portion 13d across the height area lower than the driving motor 30. In this case, the impact load can be highly efficiently transferred at the sufficiently low position of the inner side frame portion 13d.

Furthermore, the invention is not limited to only the above-described embodiment, and may be changed in design into various forms within the scope without departing from the spirit thereof. For example, in the above-described embodiment, the front under plate 25 as the plate-shaped reinforcement member is provided separately from the rear under plate 24 as the plate-shaped rigid member, but the plate-shaped reinforcement member may not be necessarily provided.

Further, in the above-described embodiment, the rear under plate 24 disposed in rear of the lower frame portion 13b and the tilting shaft 15 is formed as the plate-shaped rigid member, but only the front under plate 25 disposed in front of the lower frame portion 13b and the tilting shaft 15 is provided, and the front under plate 25 may be formed as the plate-shaped rigid member. Furthermore, in the above-described embodiment, the seatback frame 13 is supported to the rear end of the cushion frame 7 through the tilting shaft 15, but the seatback frame 13 may be supported to the vehicle body through the tilting shaft 15.

Further, in the case of the above-described embodiment, the main pipe 12 is formed in a non-annular structure of which ends are spaced from each other, but the main pipe 12 may be formed in an annular structure.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle seat comprising:
   a seatback frame that includes a pair of an outer side frame portion and an inner side frame portion which are disposed to be spaced from each other in a seat width direction and are disposed near an inside and an outside of a vehicle width direction, and a lower frame portion extending in the seat width direction between lower areas of the outer side frame portion and the inner side frame portion;
   a tilting shaft that supports the seatback frame at a position below the lower frame portion so as to be tiltable about a cushion frame or a vehicle body; and
   a first load transfer block that protrudes outward in the vehicle width direction from an upper side of the outer side frame portion in the vehicle width direction and transfers an impact load input from a side portion of the vehicle body to the seatback frame, the first load transfer block being provided above the tilting shaft, wherein the vehicle seat further comprises:
a plate-shaped rigid member of which an upper end is connected to the lower frame portion and an inner end in the vehicle width direction is connected to the inner side frame portion in the vehicle width direction; and
a plate-shaped reinforcement member of which an upper end is connected to the lower frame portion and a lower end is connected to a lower end of the plate-shaped rigid member,
wherein a lower edge of the plate-shaped rigid member extends downward to below the lower frame portion and below the tilting shaft, the plate-shaped rigid member and the plate-shaped reinforcement member form a closed cross-section extending in the vehicle width direction, the plate-shaped reinforcement member is disposed in front of the tilting shaft, and the plate-shaped rigid member is disposed in rear of the tilting shaft, and
wherein the lower frame portion is provided with a slope that is bent obliquely upward and toward the outer side frame portion in the vehicle width direction and the plate-shaped rigid member is connected to the lower frame portion so as to be along the slope.

2. The vehicle seat according to claim 1, further comprising:
a second load transfer block that protrudes outward in the seat width direction from a position extending from the tilting shaft near the outer side frame portion in the vehicle width direction and transfers the impact load input from the side portion of the vehicle body to the seatback frame.

3. The vehicle seat according to claim 1,
wherein the plate-shaped rigid member is connected to the inner side frame portion in the vehicle width direction at a height position lower than the tilting shaft.

4. The vehicle seat according to claim 1,
wherein the tilting shaft is disposed inside the closed cross-section formed by the plate-shaped rigid member and the plate-shaped reinforcement member.

5. The vehicle seat according to claim 1,
wherein a distant space is provided between an inner end of the lower frame portion in the vehicle width direction and the inner side frame portion in the vehicle width direction, and a driving motor is disposed in the distant space so as to adjust a tilting angle of the seatback frame.

6. The vehicle seat according to claim 5,
wherein the plate-shaped rigid member connects the lower frame portion to the inner side frame portion in the vehicle width direction by bypassing an outside of the driving motor.

7. The vehicle seat according to claim 6,
wherein the plate-shaped rigid member extends from the lower frame portion to a height going around a lower side of the driving motor, and the inner end of the plate-shaped rigid member in the vehicle width direction is attached to the inner side frame portion in the vehicle width direction across a height area lower than the driving motor.

8. The vehicle seat according to claim 1,
wherein the lower frame portion, the plate-shaped reinforcement member, and the plate-shaped rigid member are disposed in a substantially same horizontal plane above the tilting shaft, and the plate-shaped rigid member and the lower frame portion are connected above the tilting shaft.

9. The vehicle seat according to claim 1,
wherein the lower frame is formed by a pipe material, extends to the first load transfer block, and obliquely transfers the impact load input from the side portion of the vehicle body through the first load transfer block.

* * * * *